Jan. 7, 1969  D. A. WILLIAMS  3,419,963
OPTIC CENTER FINDER
Filed Dec. 29, 1967
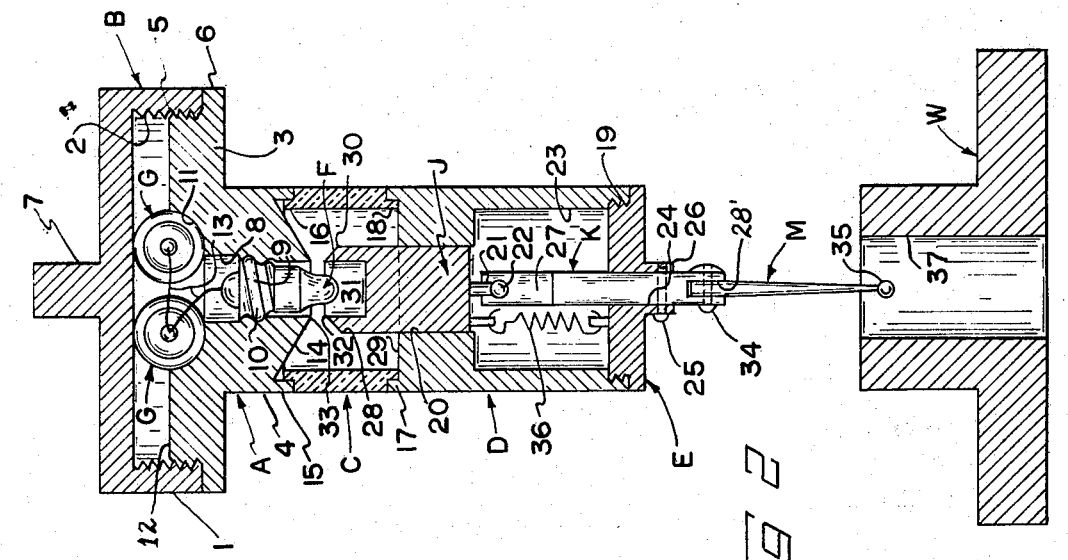
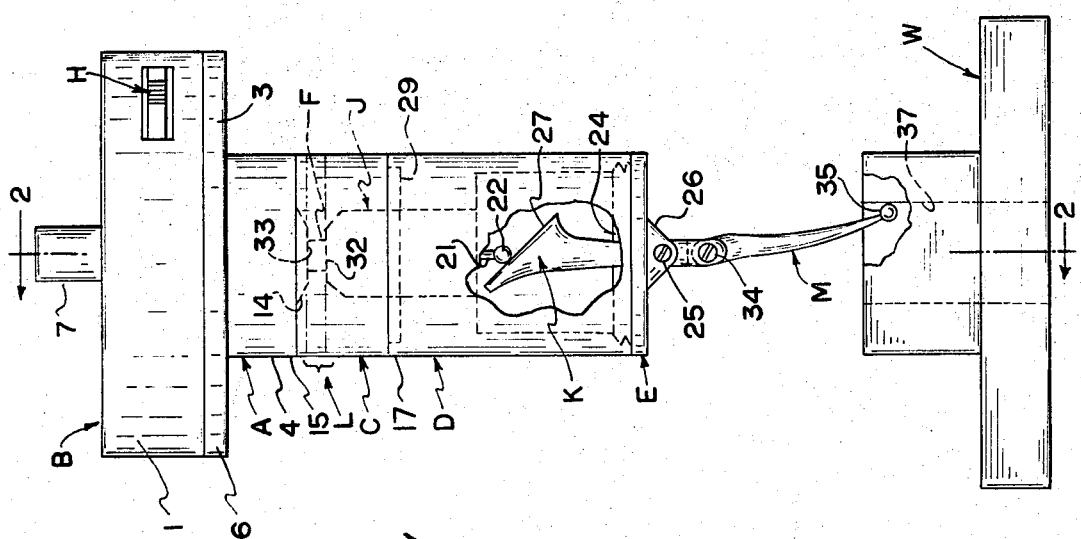
INVENTOR
DONALD A. WILLIAMS
BY
*William R. Piper*
ATTORNEY 3,419,963
OPTIC CENTER FINDER
Donald A. Williams, 18287 Center St.,
Castro Valley, Calif. 94546
Filed Dec. 29, 1967, Ser. No. 694,724
U.S. Cl. 33—169                            4 Claims
Int. Cl. G01b 3/22; G01b 5/00

ABSTRACT OF THE DISCLOSURE

An optic center finder for simplifying the setting up of parts on a boring or milling machine where it is required that the spindle of the machine be positioned at the center of a circular opening in the workpiece or at the center of a cylindrical boss on the workpiece. A circular window extends entirely around the body of the device and novel means is used for continuously varying the width of the light band projected through the window when the chuck center is out of alignment with the axis of the opening or boss. The band width remains constant when the spindle is in alignment with the opening or boss.

Background of the invention (1) Field of the invention.—A workpiece may have a circular bore therein or a cylindrical boss thereon and an operator may wish to center a spindle with respect to the circular bore or opening in order to enlarge it on the same center line or with respect to the cylindrical boss in order to accomplish further work on it. The operator places the work on the machine table that has a chuck with a rotatable spindle. He would then have to locate the axis of the circular opening or boss before commencing his operation.

(2) Description of the prior art.—The patent to W. S. Pierce, Jr., No. 2,109,976, is for a center finding device in which a work-engaging section is moved into contact with a flat surface on the work, the work being mounted on a transversely movable table. The work-engaging section will move if the flat surface is out of line and will close an electric circuit to an electric lamp. The device cannot be used for locating the center of a circular opening or cylindrical boss.

The patent to Simer, No. 2,490,483, on a locating device makes use of a contact arm with a pointed end that can be centered with an opening such as a center punched depression in a workpiece. A bulb remains lighted so long as the pointed end of the contact arm is off center. Other patents, Nos. 2,814,124; 3,115,710; and 3,167,866, make use of dial indicators instead of lights and these indicating devices must have their dial-supporting bodies held against rotation with the chuck in order that the dials may be read.

Summary of the invention

An object of my invention is to provide an optic center finder that may be attached to and rotated by a chuck holding device. The body of the device is cylindrical and the circular window with the variable width light band can be viewed through the window even while the body and window are rotating. The device makes use of an adjustable probe or feeler that can be swung into an angular position with respect to the longitudinal axis of the body of the device so as to contact with the rim of a circular opening in the work or with the outer surface of a cylindrical boss.

A further object of my invention is to provide a device of the type described that can be read while the device is rotating and no auxiliary equipment need be used for reading purposes. The reading can be taken from any angle or side. There is a high degree of accuracy in using the device.

Brief description of the drawing

FIGURE 1 is an elevational view of the device.

FIGURE 2 is a vertical section taken along the line 2—2 of FIGURE 1.

Description of the preferred embodiment

In carrying out my invention I provide a cylindrical body having an upper housing A, with a cover or cap B, a translucent cylindrical window C, cemented or otherwise secured to the lower end of the housing A, a lower housing D, suspended from the lower end of the cylindrical window C, and a base member E, having a threaded connection with the bottom of the lower cylindrical housing D. All parts of the housing may be made of metal or plastic and the cylindrical window C may be made of glass or plastic.

The cover B has an annular flange 1, that is internally threaded at 2. The upper housing A has a top portion 3 of a larger diameter than that of the outer cylindrical surface 4 of the housing. This top portion 3 has an outer circular threaded portion 5 adapted to receive the threaded portion 2 of the cap B, and it has an outwardly extending annular flange 6 adapted to be contacted by the lower edge of the cap flange 1 when the cap or cover is screwed into place on the top of the upper housing A. The cap B has an integral stub 7 that is axially aligned with the axis of the upper housing A and is adapted to be removably received in a chuck, not shown.

The upper housing A has a central bore 8 with a threaded portion 9 for receiving the threaded base 10 of an electric light F. A pair of batteries G are placed in a cavity 11 provided in the upper surface 12 of the top 3, and electric wires 13 connect these batteries to the light F and to an ON-OFF switch H, shown in FIGURE 1 as being mounted in the flange 1 of the cap B. The switch H may be manually turned on to light the lamp F when the device is to be used.

FIGURE 2 shows the bottom of the upper housing as having a conical-shaped surface 14 extending upwardly from the lower end of the bore 8. An annular flange 15 is integral with the upper housing A. The cylindrical window C has an upper annular flange 16 that fits inside of the depending upper housing flange 15 and is cemented or otherwise secured thereto.

The lower housing D has an upwardly extending annular flange 17, see FIGURE 2, that is cemented or otherwise secured to a lower annular flange 18 on the cylindrical window C. In this way the three parts of the body of the device are permanently connected together to form a single unit, namely: the upper housing A, the cylindrical window C, and the lower housing D. The base member E is secured to the bottom of the lower housing D by cooperating threaded portions 19 in both parts. The circular window C, encloses a compartment 29.

FIGURE 2 further shows the lower housing D with an axial bore 20 for slidably receiving a cylindrical light gate J. This light gate may be made of aluminum in order to be light in weight. It has an integral, axially aligned cam follower 21 with a spherical head 22. The cam follower extends into a compartment 23 provided in the lower portion of the housing D. A lever K extends through a slot 24 in the base member E and is pivotally supported by a screw 25 that extends through a pair of ears 26 that depend from the base member and parallel each other. The upper end of the lever K has a cam edge 27 against which the spherical head 22 of the cam follower 21, rides. A tension spring 36 is attached to the bottom of the light gate J and to the base member E for keeping the cam follower 21 in contact with the cam surface 27 of the lever K, at all times.

The top of the light gate has a conical outer surface 30 that extends upwardly and inwardly from a circular line 28 and a recess 31 is provided in the top of the light gate for receiving the light F. The upper circular edge 32 of the light gate is moved toward or away from a lower circular edge 33 formed at the bottom of the conical-shaped surface 14, and this movement is caused by the swinging of the lever K and the cam surface 27 against the cam follower 21 that is carried by the light gate. The light rays from the lamp F are formed into a circular band of light that extends around the cylindrical window C and is viewed from the outer surface of the window as a band of light having a definite width. The width of the light band L shown by the parallel lines which are bracketed in FIGURE 1, will vary according to the distance the circular edge 32 of the light gate J, is removed from the circular edge 33 formed at the lower point of the conical surface 14. If the lever K is swung on its pivot 25, the width of the light band L will vary.

The axis of the pivot screw 25 extends through the longitudinal axis of the cylindrical light gate J. The lower end of the lever K is formed with a recess 28' therein and an adjustable probe or feeler M has its upper end received in the recess. A clamping bolt 34 pivotally connects the probe to the lever and the threaded portion of the bolt is received in a nut that has a rounded head. This bolt is tightened by means of a screwdriver so that it will frictionally hold the probe in the angle into which it has been manually swung. If now the probe is swung in a manner to be explained in describing the operation of the device, it will swing the lever K as a unit therewith.

*Operation*

From the foregoing description of the various parts of the device the operation thereof may be readily understood. The work W has a bore 37 in it and a machinist wishes to enlarge the diameter of the bore. He can place the work W on a boring machine, not shown, that has X–Y positioning slides, not shown, extending at right angles to each other. Next, he would place the optical center finder in the spindle chuck, not shown, by chucking on the stub 7 of the cover B. Then he would place the probe M in the bore 37 of the work W and swing the probe about the bolt 34 until the outer end of the probe would contact the wall of the bore 37. The friction on the probe M by the bolt 34 will make the probe and lever swing as a unit about the pivot 25. The chuck is rotated at a slow r.p.m. and the device will rotate the probe inside the bore. If the bore axis is not concentric with the spindle axis, the probe will deflect or swing as it passes the high side of the bore for each revolution. This will cause the lever to swing and its cam will cause the cylindrical light gate J to move along its axis and vary the width of the light band L. The switch H has previously been turned on to energize the light F. The variations in the width of the light band are readily visible to the machinist. He adjusts the X–Y slides of the machine to move the work with reference to the probe M so as to diminish the amplitudes of the constantly changing widths of the light band. When the work W, has been moved so as to align the axis of the bore 37 with the axis of the spindle, not shown, the width of the light band will not vary and the light band will have a fixed width on the cylindrical window C. The optical center finder may now be removed and the boring operation on the work completed.

The invention works on the principle that when the probe M is deflected, the lever K will also be swung on its pivot 25 in the opposite direction and cause the light gate J to move upwardly to narrow the space between the edge 32 on the light gate and the edge 33 of the conical surface 14. The width of the light band L on the cylindrical window C will also be narrowed. When the probe M ceases to be deflected by the wall of the bore 37, the axis of the bore will be aligned with the spindle axis.

The device can be produced and sold at a moderate price and it is inexpensive to maintain. It is easier and quicker to use than other standard systems. Since the light band is on a cylindrical window a person can use it while it is rotating.

I claim:
1. An optic center finder comprising:
 (a) a body having a cylindrical window;
 (b) means for securing the body to a rotating member so that the body axis is in alignment with the axis of the rotating member;
 (c) a source of light disposed within said body substantially adjacent the window;
 (d) a light gate having a recess adapted to enclose said light source; the recess having a circular edge at its open end, the gate being movable along the body axis for moving said edge toward and away from a light concealing position;
 (e) a probe; and
 (f) means pivotally mounted on said body for interconnecting said probe with said light gate for causing any movement of said probe toward or away from said body axis to move said gate for moving the circular edge of said recess toward and away from the light concealing position to vary the width of the light band projected against said circular window.

2. The combination as set forth in claim 1, and in which:
 (a) said means that interconnects said probe with said light gate includes a lever pivotally carried by said body;
 (b) said probe being swingably secured to said lever and being securable thereto in adjusted position;
 (c) said light gate having a cam follower;
 (d) said lever having a cam edge; and
 (e) yielding means for moving said light gate for maintaining said cam follower in contact with said cam edge, a swinging of said lever causing said cam edge to move said cam follower and light gate for moving the circular edge of said recess toward or away from said light concealing position.

3. The combination as set forth in claim 1, and in which:
 (a) said light gate is cylindrical in form and said body has an axially aligned cylindrical bore for slidably receiving said light gate;
 (b) the top of said light gate having a conical outer surface sloping downwardly from the circular edge that forms the open end of said recess;
 (c) the light source including an electrical lamp and said body having a second bore for receiving said lamp, the lamp having a portion projecting beyond said second bore that is adapted to be received in the recess of said light gate when the latter is moved toward said second bore to close it;
 (d) the distance between the ends of the second bore and light gate recess determining the width of the light band that is projected upon the cylindrical window.

4. The combination as set forth in claim 3, and in which:
 (a) the surface portion of said body lying adjacent to said second bore sloping upwardly from the entrance to said second bore;
 (b) whereby the two sloping surfaces diverge from each other for offering no obstruction to the light rays from said lamp when said light gate recess is spaced from the entrance to said second bore.

References Cited
UNITED STATES PATENTS

| | | |
|---|---|---|
| 1,141,396 | 6/1915 | Jubinville. |
| 2,076,819 | 4/1937 | Jones. |
| 2,645,024 | 7/1953 | Pool. |
| 3,125,810 | 3/1964 | Hartmeister. |

HARRY N. HAROIAN, *Primary Examiner.*